US009895684B2

United States Patent
Bull et al.

(10) Patent No.: US 9,895,684 B2
(45) Date of Patent: Feb. 20, 2018

(54) PROCESS FOR THE PREPARATION OF ZEOLITES HAVING CHA STRUCTURE

(71) Applicant: BASF SE, Ludwigshafen (DE)

(72) Inventors: Ivor Bull, Hopewell Junction, NY (US); Ulrich Müller, Neustadt (DE)

(73) Assignee: BASF SE, Ludwigshafen (DE)

( * ) Notice: Subject to any disclaimer, the term of this patent is extended or adjusted under 35 U.S.C. 154(b) by 298 days.

(21) Appl. No.: 14/534,642

(22) Filed: Nov. 6, 2014

(65) Prior Publication Data
US 2015/0132215 A1  May 14, 2015

Related U.S. Application Data

(63) Continuation of application No. 13/511,755, filed as application No. PCT/EP2010/067979 on Nov. 23, 2010, now Pat. No. 8,883,119.
(Continued)

(51) Int. Cl.
*C01B 39/48* (2006.01)
*B01J 29/70* (2006.01)
(Continued)

(52) U.S. Cl.
CPC ........ *B01J 29/763* (2013.01); *B01D 53/9418* (2013.01); *B01J 29/7015* (2013.01);
(Continued)

(58) Field of Classification Search
CPC ......... C01B 39/00; C01B 39/02; C01B 39/04; C01B 39/48; B01J 29/7015; B01J 29/763;
(Continued)

(56) References Cited

U.S. PATENT DOCUMENTS 3,030,181 A   4/1962 Milton et al.
3,306,922 A   2/1967 Barrer et al.
(Continued)

FOREIGN PATENT DOCUMENTS

EP   0158975   10/1985
EP   0185348   10/1985
(Continued)

OTHER PUBLICATIONS

Final Office Action in U.S. Appl. No. 13/511,755, dated Mar. 27, 2014, 7 pages.
(Continued)

*Primary Examiner* — David M Brunsman
(74) *Attorney, Agent, or Firm* — Oblon, McClelland, Maier & Neustadt, L.L.P.

(57) ABSTRACT

Zeolites having CHA framework structure and a composition comprising the molar ratio (n SiO2): X2O3, wherein X is a trivalent element, and wherein n is at least 10, wherein the crystal size, as determined from Scanning Electron Microscopy, is greater than 1 micrometer and wherein the chabazite framework is phase-pure having an impurity of other zeolitic frameworks, such as RUT 25 as determined by X-ray Diffraction, of less than 5%. The process for the preparation comprises:
(i) preparation of an aqueous solution containing at least one source for X2O3, wherein X is selected from Al, B, Ga, and a mixture of two or more, and at least one source for SiO2, at least one organic structure directing agent (SDA) other than Tetramethylammonium hydroxide (TMAOH), acting as a template for the CHA structure, and Tetramethylammonium hydroxide (TMAOH), wherein the SDA or mixtures thereof are employed in such amounts that the aqueous solution in (i) exhibits a molar ratio of SDA : TMAOH of 0.01 to 5;

(Continued)

(ii) hydrothermal crystallization of the aqueous solution according to (i); wherein the aqueous solution of (i) contains copper in an amount less than 0.005 Cu:((n YO2)+X2O3) where n is in the range of 10 to 50.

14 Claims, 9 Drawing Sheets

Related U.S. Application Data

(60) Provisional application No. 61/263,831, filed on Nov. 24, 2009.

(51) Int. Cl.
| | | |
|---|---|---|
| *B01J 29/76* | (2006.01) | |
| *B01D 53/94* | (2006.01) | |
| *B01J 37/02* | (2006.01) | |
| *C01B 39/00* | (2006.01) | |
| *C01B 39/02* | (2006.01) | |
| *C01B 39/04* | (2006.01) | |
| *C01B 39/46* | (2006.01) | |
| *B01J 35/04* | (2006.01) | |

(52) U.S. Cl.
CPC .......... *B01J 37/0246* (2013.01); *C01B 39/00* (2013.01); *C01B 39/02* (2013.01); *C01B 39/04* (2013.01); *C01B 39/46* (2013.01); *C01B 39/48* (2013.01); *B01D 2251/2067* (2013.01); *B01D 2253/108* (2013.01); *B01D 2255/20761* (2013.01); *B01D 2255/50* (2013.01); *B01D 2257/402* (2013.01); *B01D 2257/404* (2013.01); *B01D 2258/012* (2013.01); *B01J 35/04* (2013.01); *Y02C 20/10* (2013.01); *Y02P 20/153* (2015.11)

(58) Field of Classification Search
CPC ............. B01J 37/0246; B01D 53/9418; B01D 2257/402
See application file for complete search history.

(56) References Cited

U.S. PATENT DOCUMENTS

| | | | |
|---|---|---|---|
| 4,060,590 A | 11/1977 | Whittam et al. | |
| 4,310,440 A | 1/1982 | Wilson et al. | |
| 4,473,663 A | 9/1984 | Patton et al. | |
| 4,544,538 A * | 10/1985 | Zones | B01J 29/70 423/706 |
| 4,737,353 A | 4/1988 | Flanigen et al. | |
| 6,709,644 B2 * | 3/2004 | Zones | B01D 67/0051 423/213.2 |
| 7,067,108 B2 | 6/2006 | Mertens et al. | |
| 7,883,678 B2 * | 2/2011 | Li | B01D 53/9418 423/212 |
| 8,404,203 B2 * | 3/2013 | Bull | B01D 53/9418 423/177 |
| 8,409,546 B2 * | 4/2013 | Bull | B01D 53/9418 423/700 |
| 8,603,432 B2 * | 12/2013 | Andersen | B01D 53/9418 423/210 |
| 8,883,119 B2 * | 11/2014 | Bull | B01D 53/9418 423/703 |
| 2003/0176751 A1 | 9/2003 | Strohmaier et al. | |
| 2005/0197520 A1 | 9/2005 | Mertens et al. | |
| 2008/0233031 A1 | 9/2008 | Yuen et al. | |
| 2009/0196812 A1 | 8/2009 | Bull et al. | |
| 2010/0310440 A1 | 12/2010 | Bull et al. | |
| 2010/0322847 A1 | 12/2010 | Xiao et al. | |
| 2011/0020204 A1 | 1/2011 | Bull et al. | |
| 2011/0076229 A1 | 3/2011 | Trukhan et al. | |
| 2011/0142755 A1 | 6/2011 | Bull et al. | |
| 2011/0300028 A1 | 12/2011 | Bull et al. | |
| 2011/0300042 A1 | 12/2011 | Bull et al. | |
| 2012/0208691 A1 | 8/2012 | Bull et al. | |

FOREIGN PATENT DOCUMENTS

| | | |
|---|---|---|
| EP | 0161490 | 11/1985 |
| EP | 0158348 | 12/1988 |
| GB | 868846 | 5/1961 |
| WO | WO-03/020641 | 3/2003 |
| WO | WO-2005/003622 | 1/2005 |
| WO | WO-2008/106519 | 9/2008 |
| WO | WO-2008/118434 | 10/2008 |
| WO | WO-2008/132452 | 11/2008 |
| WO | WO-2009/009248 | 1/2009 |

OTHER PUBLICATIONS

Non-Final Office Action in U.S. Appl. No. 13/511,755, dated Dec. 19, 2013, 7 pages.
PCT International Search Report and Written Opinion in PCT/EP2010/067979, dated Feb. 4, 2011, 14 pages.
PCT International Preliminary Report on Patentability in PCT/EP2010/067979, dated May 30, 2012, 9 pages.
Barrer, R. M., et al., Synthetic Chabazites: Correlation between Isomorphous Replacements, Stability, and Sorption Capacity, *Journal of the Chemical Society* 1956, 13 pages.
Barrer, Richard M., Zeolites and their synthesis, *Zeolites*, vol. 1 Oct. 1981, 130-140.
Diaz-Cabanas, Maria-Jose, et al., Synthesis and structure of pure SiO2 chabazite: the SiO2 polymorph with the lowest framework density, *Chem. Commun.* 1998, 2 pages.
Gies, H., et al., Ab-initio structure determination of zeolite RUB-10 from low resolution X-ray powder diffraction data, *Zeischrift fur Kristallographic* 210 1995, 475-480.
Haddad, George J. et al., "Characterization of La3+-Promoted Co/SiO2 Catalysts", *Journal of Catalysis*, 160, Article No. 0122 1996, 43-51.
Kuhl, G. H., Influence of Phosphate and Other Complexing Agents on the Crystallisation of Zeolites, *Society of Chemical Industry* 1968, 9 pages.
Lillerud, Karl P., et al., On the synthesis of erionite-offretite intergrowth zeolites, *Zeolites*, vol. 6 Nov. 1986, 474-483.
Meier, W. M., et al., Zeolite Structure Type EAB: Crystal Structure and Mechanism for the Topotactic Transformation of the Na, TMA Form, *Journal of Solid State Chemistry*, 37 1981, 204-218.
Rudolf, Philip R., et al., Preparation and X-ray Powder Structure Solution of a Novel Aluminum Phosphate Molecular Sieve, (AlPO4)3 (CH3)4NOH, *J. Phys. Chem*, 90 1986, 6122-6125.

* cited by examiner

PROCESS FOR THE PREPARATION OF ZEOLITES HAVING CHA STRUCTURE

CROSS-REFERENCE TO RELATED APPLICATIONS

This application is a continuation under 35 U.S.C. § 120 of U.S. patent application Ser. No. 13/511,755, now U.S. Pat. No. 8,882,119, which is the national stage entry of PCT/EP2010/067979, filed on Nov. 23, 2010, which claims priority to U.S. Patent Application No. 61/263,831, filed on Nov. 24, 2009, the disclosures of which are incorporated herein by reference in their entireties.

FIELD

Embodiments of the present invention relate to zeolitic materials that have the CHA crystal structure, processes for their preparation, and catalysts comprising such zeolitic materials.

BACKGROUND

Zeolitic materials having chabazite (CHA) framework structure are widely used in important actual technical areas such as in the automotive industry where the materials are employed as catalysts. The reduction of nitrogen oxides with ammonia to form nitrogen and $H_2O$ can be catalyzed by metal-promoted zeolites to take place preferentially to the oxidation of ammonia by the oxygen or to the formation of undesirable side products such as $N_2O$, hence the process is often referred to as the "selective" catalytic reduction ("SCR") of nitrogen oxides, and is sometimes referred to herein simply as the "SCR" process. The catalysts employed in the SCR process ideally should be able to retain good catalytic activity over the wide range of temperature conditions of use, for example, 200° C. to 600° C. or higher, under hydrothermal conditions and in the presence of sulfur compounds. High temperature and hydrothermal conditions are often encountered in practice, such as during the regeneration of the catalyzed soot filter, a component necessary for the aftertreatment of exhaust off-gas. Thus, these materials are of high economical and ecological interest. Due to the said technical areas and the resulting need of high amounts of the materials, there is an increasing demand for efficient processes for the preparation of these materials.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001). Chabazite is one of the molecular sieves for which a structure has been established, and the material of this framework-type is designated as CHA. Zeolitic materials as used herein are defined as metallosilicate frameworks including aluminosilicates, borosilicates and gallosilicates. It does not include the MeAPSO, APSO, or AlPO family of materials.

Chabazite is a zeolite which occurs in nature and also has synthetic forms. Synthetic forms are described in "Zeolite Molecular Sieves" by Breck (1973). The structure of Chabazite is described in "Atlas of Zeolite Structure Types" by Meier and Olson (1978). The Chabazite structure has been designated with the structure code, "CHA".

Natural Chabazite exists in nature and has a $SiO_2:Al_2O_3$ typically less than 10. Synthetic forms of this low $SiO_2:Al_2O_3$ range include zeolite "K-G", zeolite D and zeolite R. Zeolite "K-G" is reported by Barrer et al. in J. Chem. Soc., 1956, p 2892-. Zeolite D is reported in British patent number 868,846. Zeolite R is reported in U.S. Pat. No. 3,030,181.

Synthesis of high-silica Chabazite (>10 $SiO_2:Al_2O_3$) is reported in U.S. Pat. No. 4,544,538, U.S. Pat. No. 6,709,644 and US 2003/0176751 A1.

U.S. Pat. No. 6,709,644 discloses a high-silica CuChabazite (SSZ-62) with small crystal size (<0.5 microns) with application in SCR of NOx.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with copper sulfate or copper acetate. Catalytic activity is largely retained after hydrothermal aging at 850° C. for 6 hours.

WO 2008/132452 discloses a number of zeolite materials, including CuSSZ-13, that can be loaded with iron and/or copper. Catalytic activity is largely retained after hydrothermal aging of CuSSZ-13 at 900° C. for 1 hour. Although no specific mention of Na levels appears it is stated than an ammonium exchange is employed prior to the Cu exchange to remove Na.

WO 2008/118434 indicates that a CuSSZ-13 (15 to 60 $SiO_2:Al_2O_3$) material that can retain at least 80% of its surface area and micropore volume after hydrothermal aging at 900° C. in 10% steam for 1 to 16 hours would be suitable for application in SCR. Example 3 indicates that an ammonium exchange is carried out to remove residual Na. Additionally, a comparison of medium-sized crystals to large-sized crystals of SAPO-34 indicated improved stability for the larger crystals.

In all cases Na is first removed by ammonium exchange prior to the introduction of Cu. The resultant Na content is not disclosed. In table 8 of U.S. Pat. No. 4,544,538 Na contents of >0.5% $Na_2O$ are reported for examples 2 through 5 following ammonium exchange. Prior to ammonium exchange the Chabazites prepared with alkali metal hydroxides in the synthesis gel would be expected to contain >0.5 wt % $Na_2O$.

The state of the art preparation of a Cu-Chabazite is described by the following key steps:
1. Crystallization of a alkali metal/SDA containing chabazite and separation from the synthesis gel
2. Drying and calcination to remove the SDA leading to the H—Na(alkali) form of Chabazite
3. Ammonium exchange to remove alkali metals
4. Copper exchange to introduce Cu

SUMMARY

One aspect of the present invention relates to a process for the preparation of zeolites having CHA framework structure and a composition comprising the molar ratio (n $SiO2$): $X2O3$, wherein X is a trivalent element, and wherein n is at least 10, the process comprising
(i) preparation of an aqueous solution containing at least one source for X2O3, wherein X is selected from Al, B, Ga, and a mixture of two or more, and at least one source for SiO2, at least one organic structure directing agent (SDA) other than Tetramethylammonium hydroxide (TMAOH), acting as a template for the CHA structure, and Tetramethylammonium hydroxide (TMAOH), wherein the SDA or mixtures thereof are employed in such amounts that the aqueous solution in (i) exhibits a molar ratio of SDA:TMAOH of 0.01 to 5;
(ii) hydrothermal crystallization of the aqueous solution according to (i);
wherein the aqueous solution of (i) contains copper in an amount less than 0.005 Cu: ((n SiO2)+X2O3) where n is at least 10.

In some embodiments, the process comprises:
1. Crystallization of TMA/SDA containing chabazite and separation from the synthesis gel
2. Drying and calcination to remove the SDA leading to the H-form of Chabazite
3. Copper exchange to introduce Cu Another aspect of the present invention relates to the zeolitic materials obtainable and/or obtained by this process as well as to a zeolitic material as such, having framework structure CHA, having a composition comprising the molar ratio (n SiO2):X2O3, wherein X is a trivalent element and n is at least 10, and wherein the crystal size, as determined from Scanning Electron Microscopy, is greater than 1 micrometer and wherein the chabazite framework is phase-pure having an impurity of other zeolitic frameworks, such as RUT as determined by X-ray Diffraction, of less than 5%, based on the total zeolitic framework.

DETAILED DESCRIPTION

Removal of alkali metals is important for the stability and activity of SCR catalysts. WO 2008/132452 suggests that the poor SCR performance of an alkali-metal containing CuChabazite could be attributed to poisoning of the acid sites and report little activity even in the fresh catalyst. Whereas, U.S. application Ser. No. 12/612,142 filed on Nov. 4, 2009 indicates good SCR performance of a CuChabazite prepared from a similar parent material where the alkali-metals have been largely removed supporting the importance of low alkali-metal content.

Many catalytic uses for zeolitic materials involve the H-form and so step 2 of the inventive process already delivers an active material without the need for further processing. Such an application could include catalysts used in methanol to olefin chemistry.

Furthermore, the ion-exchange steps can lead to dealumination/deboronation due to the acidic pH conditions employed. The dealumination/deboronation limits the amount of active cations that can be introduced since it results in loss of exchange capacity and can lead to instability of the zeolite structure. Dealumination is linked to instability of SCR catalysts such as CuZSM-5 (Journal of Catalysis, 1996, p 43-).

Thus, the disadvantage of the multi-step synthesis route is the dealumination which can occur during ion-exchange steps. Additionally, each exchange step adds additional cost and additional complexity to the process. Partial replacement of expensive template molecules, such as trimethyladamantyl ammonium hydroxide, with tetramethylammonium hydroxide offers additional cost savings. The invention process results in a lower cost, less complex and less damaging synthesis route for the production of H-Chabazite and other metal containing forms of Chabazite.

Tetramethylammonium hydroxide (TMAOH) has been utilized as a templating agent and OH$^-$ source in numerous zeolite, zeolitic (e.g. borosilicate, gallosilicate etc) and non-zeolitic (i.e. AlPO, MeAPO, and MeAPSO compositions) syntheses including the preparation of ATT, CAN, CHA, EAB, ERI, ERI/OFF, FAU, FER, GIS, GME, LTA, MAZ, OFF, and SOD.

Barrer et al. discusses the role of OH$^-$ as a mineralizing agent together with the structure directing role of cations such as alkali metals and organic additives or templates (Zeolites, 1981, p 130). Control of both is critical for the selective crystallization of zeolite phases.

A number of Aluminophosphate materials can be crystallized using TMAOH including AlPO-12 (ATT—J. Phys. Chem., 1986, p 6122), AlPO-33 (ATT—U.S. Pat. No. 4,473,663), ZnAPSO-43 (GIS—EP 158,975), ALPO-20 (SOD—U.S. Pat. No. 4,310,440), BeAPSO-20 (SOD—U.S. Pat. No. 4,737,353), MgAPSO-20 (SOD—EP 158,348), MnAPSO-20 (SOD—EP 161,490) and ZnAPSO-20 (SOD—EP 158,975). These systems are synthesized in the absence of an alkali metal hydroxide since these materials typically crystallize in near neutral pH or less alkaline pH than the aluminosilicates materials. Consequently, these materials are considered alkali-metal free. Tetramethylammonium (TMA) is occluded within the microporous cavities of the material during crystallization.

The synthesis of the aluminosilicates ERI and OFF are described in many articles due to the overlapping synthesis conditions that often result in the intergrown product of the two known as ZSM-34. This complexity is comprehensively described in Zeolites, 1986, p 745. In all cases alkali metal hydroxides are used in combination with TMA. This paper represents the structures of ERI and OFF with the TMA cation occluded within the cages. The independent phases can be prepared by careful control of gel composition. Barrer et al. described the combination of TMA with alkali metal hydroxides for the preparation of CAN, LTA, OFF, ERI, EAB, GME, SOD and MAZ (Zeolites, 1981, p 130). The aluminosilciate, EAB crystallizes from a Na or K and TMA gel at temperatures of about 80° C. (J. Solid State Chem., 1981, p 204). In all cases the syntheses report a combination of TMA with an alkali metal resulting in the incorporation of both in the zeolite product.

Chabazite (zeolite ZK-14) with low $SiO_2:Al_2O_3$ has also been reported to form with (K, Na, TMA) mixtures where K is preferred (Molec. Sieves, Soc. Chem. Ind., 1968, p 85). U.S. Pat. No. 4,544,538 teaches the synthesis of high silica chabazite from trimethyladamantylammonium hydroxide (TMAA) and sodium hydroxide reaction gels. It is mentioned that sodium hydroxide could be replaced by the addition of more template, whereas the template is typically a bicycle hetereoatom compound. It is disclosed that the preferred OH/Si ratio is <0.96 for the formation of chabazite with >20 $SiO_2:Al_2O_3$. However, the addition of more template would result in a significant increase in cost and perhaps issues with waste water due to increased residual organic in the mother liquor following crystallization.

Zeolite RUT (Nu-1—U.S. Pat. No. 4,060,590 and RUB10, Z. Kristallogr., 1995, p 475) is formed from gels containing TMAOH with crystallization temperatures of 150 to 200° C. and reaction times of about 1.5 to 3 days. This is a common impurity phase when TMAOH is used as a replacement for alkali metal hydroxides in Chabazite synthesis due to similar reaction conditions. Increased amounts of TMAOH lead to RUT becoming the majority phase.

U.S. Pat. No. 3,306,922 describes a synthesis of zeolites N-X and N-Y (FAU), N-B and N-A (LTA) containing a substantial weight percent of a cation other than sodium or other metal cation. Specifically a low Na product is attained by using TMAOH as the only source of OH$^-$ and structure direction.

The prior art indicates that use of TMAOH, as the only organic source and in the absence of alkali-metals, would result in zeolites RUT, N-X, N-Y, N-B or N-A. No reports exist of Chabazite formation in the presence of only TMAOH.

One or more embodiments of the present invention provide a time and cost saving process for the preparation of zeolitic materials having CHA framework structure.

One or more embodiments of the present invention also provide a novel process for the preparation of zeolitic materials having CHA framework structure resulting in essentially phase-pure chabazite avoiding impurities such as zeolite RUT.

One or more embodiments of the present invention also provide a novel process for the preparation of containing zeolitic materials having CHA framework structure, wherein the zeolitic material has crystal size greater than about 1 micron.

One or more embodiments of the present invention also provide a novel process for the preparation of zeolitic materials having CHA framework structure resulting in essentially alkali-free and/or earth alkali-free chabazite.

One or more embodiments of the present invention also provide a novel process for the preparation of containing zeolitic materials having CHA framework structure, wherein the zeolitic material contains Si and Al in a high molar ratio of Si:Al.

Therefore, one or more embodiments the present invention relate to a process for the preparation of zeolites having CHA framework structure and a composition comprising the molar ratio (n $SiO_2$):$X_2O_3$, wherein X is a trivalent element, and wherein n is at least 10, the process comprising
(i) preparation of an aqueous solution containing at least one source for $X_2O_3$, wherein X is selected from Al, B, Ga, and a mixture of two or more, and at least one source for $SiO_2$, at least one organic structure directing agent (SDA) other than Tetramethylammonium hydroxide (TMAOH), acting as a template for the CHA structure, and Tetramethylammonium hydroxide (TMAOH), wherein the SDA or mixtures thereof are employed in such amounts that the aqueous solution in (i) preferably exhibits a molar ratio of SDA:TMAOH of about 0.01 to about 5,
(ii) hydrothermal crystallization of the aqueous solution according to (i);
wherein the aqueous solution of (i) contains copper in an amount less than 0.005 Cu: ((n $SiO_2$)+$X_2O_3$) where n is at least 10.

This invention is a cost efficient synthesis route to essentially alkali/earth alkali metal free chabazite by utilizing TMAOH as a replacement for alkali/earth alkali metal hydroxides (e.g. NaOH or KOH). The synthesis results in essentially phase-pure chabazite avoiding impurities such as zeolite RUT. Additionally, the product has crystal size greater than about 1 micron.

As used in this specification and the appended claims, the singular forms "a", "an" and "the" include plural referents unless the context clearly indicates otherwise. Thus, for example, reference to "a catalyst" includes a mixture of two or more catalysts, and the like.

Preferably the Chabazite molecular sieve includes all aluminosilicate, borosilicate, and gallosilicate compostions. These include, but are not limited to SSZ-13, SSZ-62, natural chabazite, zeolite K-G, Linde D, Linde R, LZ-218, LZ-235. LZ-236, and ZK-14. Most preferably the material will have the aluminosilicate composition, such as SSZ-13 and SSZ-62.

According to stage (i) of the present invention, all conceivable sources for trivalent elements X may be employed which can build up the zeolitic framework and which, as part of this zeolitic framework, are referred to as $X_2O_3$ in the context of the present invention.

Preferably, the trivalent element X is selected from the group consisting of Al, B, Ga, and a mixture of two or more thereof.

Generally, all suitable sources for $B_2O_3$ can be employed. By way of example, borates and/or boric acid, metaboric acid, ammonium metaborate, and/or boric acid esters such as boric acid triethyl ester or boric acid trimethyl ester may be mentioned. Generally, all suitable sources for $Ga_2O_3$ can be employed. By way of example, Ga nitrates may be mentioned.

Generally, all suitable sources for $Al_2O_3$ can be employed, however, a $Al_2O_3$ source is preferably employed which is free of alkali and/or earth alkali metal, in particular free of sodium. By way of example, metallic aluminum such as aluminum powder, suitable aluminates such as alkali metal aluminates, aluminum alcoholates such as aluminumtriisopropylate and aluminum hydroxide may be mentioned. According to a preferred embodiment of the present invention, however, an $Al_2O_3$ source is employed which is free of alkali and/or earth alkali metal, in particular free of sodium. Aluminum hydroxide, $Al(OH)_3$, and aluminumtriisopropylate are especially preferred.

According to an especially preferred embodiment of the present invention, the trivalent element X is Al, and even more preferably, no other trivalent element is used, Al thus being the only trivalent element building up the CHA zeolitic framework structure. Generally, all suitable sources for $SiO_2$ can be employed, however, a $SiO_2$ source is preferably employed which is free of alkali and/or earth alkali metal, in particular free of sodium. By way of example, silicates, silica, silicic acid, colloidal silica, fumed silica, tetraalkoxysilanes, silica hydroxides, precipitated silica or clays may be mentioned. In this context, both so-called "wet-process silicon dioxide" as well as so called "dry-process silicon dioxide" can be employed. Colloidal silicon dioxide is, inter alia, commercially available as Ludox®, Syton®, Nalco®, or Snowtex®. "Wet process" silicon dioxide is, inter alia, commercially available as Hi-Sil®, Ultrasil®, Vulcasil®, Santocel®, Valron-Estersil®, Tokusil® or Nipsil®. "Dry process" silicon dioxide is commercially available, inter alia, as Aerosil®, Reolosil®, Cab-O-Sil®, Fransil® or ArcSilica®. Tetraalkoxysilanes, such as, for example, tetraethoxysilane or tetrapropoxysilane, may be mentioned.

According to preferred embodiments of the present invention, dry-process silica or colloidal silica is employed. If colloidal silica is employed, it is further preferred that said colloidal silica is stabilized without alkali and/or earth alkali metal, in particular without sodium. According to even more preferred embodiments where colloidal silica is used, the colloidal silica employed as aqueous solution in (i) is stabilized with ammonia.

Generally, the sources for $X_2O_3$ and $SiO_2$ can be employed in all conceivable amounts and molar ratios for the preparation of the aqueous solution in (i) with the proviso that in (ii), a zeolite having CHA framework structure is obtained.

According to a preferred embodiment of the present invention, the at least one source for $SiO_2$ and the at least one source for $X_2O_3$ are employed in such amounts that the aqueous solution obtained according to (i) exhibits a molar ratio (n $SiO_2$):$X_2O_3$ wherein n is at least 10, more preferably at least 15. More preferably, n is in the range of from 15 to 80, more preferably from 15 to 60, more preferably from 15 to 50 such as, e.g., 15, 20, 25, 30, 35, 40, 45, 50.

As far as the structure directing agent employed in (i) is concerned, no restriction exists with the proviso that a zeolitic material having CHA framework structure is obtained in (ii).

By way of example, a suitable N-alkyl-3-quinuclidinol, a suitable N,N,N-trialkylexoaminonorbornane, a suitable N,N,N-trimethyl-1-adamantylammonium compound, a suitable N,N,N-trimethyl-2-adamantylammonium compound, a suitable N,N,N-trimethylcyclohexylammonium compound, a suitable N,N-dimethyl-3,3-dimethylpiperidinium compound, a suitable N,N-methylethyl-3,3-dimethylpiperidinium compound, a suitable N,N-dimethyl-2-methylpiperidinium compound, 1,3,3,6,6-pentamethyl-6-azonio-bicyclo(3.2.1)octane, N,N-dimethylcyclohexylamine, or a suitable N,N,N-trimethylbenzylammonium compound may be mentioned. As suitable compounds, the hydroxides of above-mentioned compounds may be mentioned. Preferably N,N,N-trimethyl-1-adamantylammonium hydroxide is employed as SDA.

Preferably, a suitable N,N,N-trimethyl-1-adamantylammonium (1-adamantyltrimethyl ammonium) compound is employed. Optionally, this suitable 1-adamantyltrimethylammonium compound can be employed in combination with at least one further ammonium compound such as, e.g., a N,N,N-trimethylbenzylammonium (benzyltrimethylammonium) compound or a tetramethylammonium compound or a mixture of a benzyltrimethylammonium and a tetramethylammonium compound.

As far as the ammonium compounds are concerned, it is conceivable that a suitable salt of the ammonium compounds is employed. Preferably, if such salt is employed, this salt or the mixture of salts should impart the desired pH to the aqueous solution to be subjected to hydrothermal crystallization. If necessary, a suitable base such as, for example, a suitable hydroxide source, can be added, in addition said salt(s) to impart said pH. Preferably, according to the present invention, the ammonium salt or ammonium salts as such are the suitable base, preferably the hydroxide source, i.e., it is preferred that the ammonium compound(s) is/are employed as hydroxide(s).

As far as the ammonium compounds are concerned, it is also possible according to the present invention to employ the respective amine compound, if necessary in combination with at least one suitable base such as, e.g. a suitable hydroxide source Generally, the sources for $X_2O_3$ and $SiO_2$ and the structure directing agent can be employed in all conceivable amounts and molar ratios for the preparation of the aqueous solution in (i) with the proviso that in (ii), a zeolite having CHA framework structure is obtained.

According to a preferred embodiment of the present invention, the at least one source for $SiO_2$ and the at least one source for $X_2O_3$ are employed in such amounts that the aqueous solution obtained according to (i) exhibits a molar ratio of structure directing agent (SDA), optionally the sum of SDAs, relative to the sum of (n $X_2O_3$) and $SiO_2$, $$(p\ SDA):((n\ SiO_2)+X_2O_3)$$

wherein p is at least 0.035, more preferably at least 0.07, more preferably at least 0.15. Even more preferably, p is less than or equal to 0.6, more preferably less than or equal to 0.5, more preferably less than or equal to 0.4, more preferably less than or equal to 0.3, and more preferably less than or equal to 0.2. Thus, according to preferred embodiments of the present invention, p is in the range of from 0.035 to 0.6, more preferably from 0.07 to 0.4, and even more preferably from 0.15 to 0.2.

Preferably, the pH of the aqueous solution obtained from (i) and subjected to hydrothermal crystallization according to (ii) is at least 10, more preferably at least 11, and even more preferably at least 12. More preferably, the pH of the aqueous solution subjected to hydrothermal crystallization according to (ii) is in the range of from 10 to 14, even more preferred in the range from 12 to 14.

Thus, the present invention also relates above-described process, wherein the pH of the aqueous solution subjected to (ii) is in the range of from 12 to 14.

Tetramethylammonium hydroxide is used to adjust the pH and OH/Si of the aqueous solution subjected to hydrothermal crystallization according to (ii) so that the pH has above-described values, depending on the starting materials employed.

According to a preferred embodiment of the present invention, the structure directing agent (SDA) or mixtures thereof are employed in such amounts that the aqueous solution obtained according to (i) exhibits a molar ratio of tetramethylammonium hydroxide (TMAOH) relative to structure directing agent (SDA), $$(rTMAOH):(SDA)$$

wherein r is preferably in the range of 0.1 to 5 preferred 0.7 to 5, even more preferred 0.7 to 4, even more preferred 0.7 to 3, even more preferred 1.1 to 3, even more preferred 1.1 to 2, even more preferred 1.1 to 1.6.

In addition to tetramethylammonium hydroxide a base which does not contain alkali and/or earth alkali metal, preferably a base which does not contain sodium, can be used for adjusting the pH.

According to a preferred embodiment of the present invention, the $OH^-/Si$ ratio in the aqueous solution obtained according to (i) is preferably in the range of 0.1 to 1, more preferred in the range of 0.1 to 0.5, even more preferred in the range of 0.1 to 0.3, even more preferred in the range of 0.1 to 0.2, even more preferred in the range of 0.12 to less than 0.2.

As already described above, the at least one source for $SiO_2$ and the at least one source for $X_2O_3$, preferably $Al_2O_2$, are free of alkali and/or earth alkali metals, in particular free of sodium. According to an even more preferred embodiment of the present invention, the aqueous solution obtained in (i) and subjected to hydrothermal crystallization in (ii) is free of alkali and/or earth alkali metals, in particular free of sodium.

The term "free of alkali metal" and "free of sodium", as used in this context of the present invention relates to the fact that no starting materials are employed which contain sodium, in particular alkali metal as essential component, such as, e.g., sodium aluminate as source for $Al_2O_2$, or the like. However, this term does not exclude such embodiments where the starting materials explicitly described contain certain amounts of sodium, in particular alkali metals as impurities. By way of example, such impurities are typically present in amounts of 1000 ppm or less, preferably 500 ppm or less, more preferably 300 ppm or less. The term "an alkali metal content of X ppm or less" as used in the context of the present, relates to an embodiment according to which the sum of all alkali metals present does not exceed X ppm. In all cases alkali metal content is reported on the basis of its metal oxide e.g. 1000 ppm $Na_2O$. It is recognized that cationic $Na^+$ resides within the zeolite pores.

Therefore, the present invention also relates to above-described process, wherein the aqueous solution subjected to hydrothermal crystallization according to (ii) is free of alkali and/or earth alkali metals, in particular free of alkali metal.

According to further embodiments, the aqueous solution obtained according to (i) may contain further metals, such as, for example, Ti, transition metals, such as Fe, Mo and/or Co, and/or lanthanides, such as La, Ce, Y.

More preferred the aqueous solution obtained according to (i) contains copper in an amount less than 0.5 wt %, preferable less than 0.1 wt %. Even more preferred the aqueous solution obtained according to (i) is free of copper.

The term "free of copper" as used in this context of the present invention relates to the fact that no starting materials are employed which contain copper. However, this term does not exclude such embodiments where the starting materials explicitly described contain certain amounts of copper as impurities. By way of example, such impurities are typically present in amounts of 1000 ppm or less, preferably 500 ppm or less, more preferably 100 ppm or less.

Generally, there are no specific restrictions in which order the starting materials are mixed to obtain the aqueous solution according to (i).

According to one embodiment of the present invention, an aqueous solution containing the at least one structure directing agent and TMAOH is optionally mixed with ammonia. In this solution, the at least one source for $X_2O_3$, preferably $Al_2O_3$, and the at least one source for $YO_2$, preferably $SiO_2$, are suspended.

According to another embodiment of the present invention, an aqueous solution containing the at least one source for $X_2O_3$, preferably $Al_2O_3$, is admixed with the at least structure directing agent and TMAOH, wherein, subsequently, the at least one source for $YO_2$, preferably $SiO_2$, is added.

According to a preferred embodiment of the present invention, the at least one source for $SiO_2$ and the at least one source for $X_2O_3$ are employed in such amounts that the aqueous solution obtained according to (i) exhibits a molar ratio of water relative to the sum of (n $X_2O_3$) and $SiO_2$, relative to the structure directing agent (SDA), optionally the sum of SDAs, and TMAOH

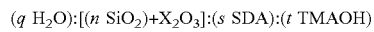

$(q\ H_2O):[(n\ SiO_2)+X_2O_3]:(s\ SDA):(t\ TMAOH)$ wherein q is preferably at least 10, more preferably at least 15 and even more preferably at least 20,
wherein n is preferably 5 to 1000, more preferred 5 to 100, even more preferred 10 to 50;
wherein s is preferably 0.025 to 0.1, more preferred 0.05 to 0.075, even more preferred 0.05 to 0.065;
wherein t is preferably 0.01 to 0.1 more preferred 0.01 to 0.1, even more preferred 0.03 to 0.1.

Even more preferably, said q is less than or equal to 70, more preferably less than or equal to 65, more preferably less than or equal to 60, more preferably less than or equal to 55, and more preferably less than or equal to 50. Thus, according to preferred embodiments of the present invention, q is in the range of from 10 to 70, more preferably from 15 to 60, and even more preferably from 20 to 50.

The temperature during the preparation of the aqueous solution according to (i) is preferably in the range of from 10 to 40° C., more preferably in the range of from 15 to 35° C., and particularly preferably in the range of from 20 to 30° C.

In principle, it is possible to heat the aqueous solution according to (ii) under any suitable pressure and any suitable temperature or temperatures, provided that it is ensured that zeolitic material of CHA framework structure crystallizes in the solution. Here, temperatures which, at the chosen pressure, are above the boiling point of the solution obtained according to (i) are preferred. Temperatures of up to 200° C. at atmospheric pressure are more preferred. The term "atmospheric pressure" as used in the context of the present invention designates a pressure of, ideally, 101 325 Pa, which, however, may be subject to variations within the limits known to the person skilled in the art.

According to a particularly preferred embodiment of the process according to the invention, the hydrothermal crystallization according to (ii) is carried out in an autoclave.

The temperature used in the autoclave according to (ii) is preferably in the range of from 100 to 200° C., more preferably in the range of from 130 to 190° C., more preferably in the range of from 140 to 180° C.

According to an even more preferred embodiment of the present invention, the autoclave employed for carrying out the hydrothermal crystallization according to (ii) exhibits means for heating and cooling the content of the autoclave, more preferably external heating means such as a suitable heating/cooling jacket.

This temperature to which the aqueous solution is heated according to (ii) can in principle be maintained until the crystallization has taken place to the desired extent. Here, time periods of up to 340 h, more preferably from 1 h to 260 h, and more preferably from 8 to 110 h are preferred. According to further preferred embodiments of the present invention, crystallization times are in the range of from 12 to 72 h, more preferably from 24 to 48 h.

During crystallization, pressure or pressures in the range of from 1 to 20 bar, more preferably from 2 to 10 bar and even more preferably from 5 to 8 bar are especially preferred.

The aqueous solution is preferably suitably stirred for the crystallization according to (ii). It is also possible to rotate the reaction vessel in which the crystallization is carried out. Typical values as far as said stirring or rotation is concerned are in the range of from 40 to 250 rpm such as from 50 to 250 rpm (revolutions per minute).

It is possible in the context of the present invention to add suitable seeding material to the solution subjected to stage (ii), such as optionally dried and/or calcined zeolitic material having CHA framework structure. Seeding may be advantageous, in particular with regard to crystallinity of the obtained chabazite material and the hydrothermal crystallization time. In the case where Al or Ga or mixtures thereof are used as $X_2O_3$, it is preferred to carry out the hydrothermal crystallization and in particular the whole inventive process without seeding material.

After hydrothermal crystallization according to (ii), the mother liquor containing the inventive zeolitic material having CHA framework structure is suitably separated from said mother liquor. Prior to separation, the temperature of the mother liquor containing the zeolitic material may be suitably decreased to a desired value employing a suitable cooling rate. Typical cooling rates are in the range of from 15 to 45° C./h, preferably from 20 to 40° C./h, and even more preferably from 25 to 35° C./h.

Typical temperatures of the cooled mother liquor containing the inventive zeolitic material having CHA framework structure are in the range of from 25 to 55° C., preferably of from 35 to 50° C.

According to one embodiment of the process according to the invention, the zeolitic material having CHA framework structure is separated in a suitable manner in at least one step from the suspension, i.e. the mother liquor containing the zeolitic material, obtained from (ii). This separation can be effected by all suitable methods known to the skilled person, for example, by decantation, filtration, ultrafiltration, diafiltration or centrifugation methods or, for example, spray drying and spray granulation methods.

Therefore, the present invention also relates to above-described process, additionally comprising
(iii) separating the zeolitic material from the suspension obtained according to (ii).

If, e.g., the zeolitic material is separated by filtration or centrifugation or concentration of the suspension obtained according to (ii), it is preferred that that the separated zeolitic material is suitably dried. Before the separated zeolitic material is dried, it may be washed at least once with a suitable washing agent, wherein it is possible to use identical or different washing agents or mixtures of washing agents in the case of at least two of the washing steps and to use identical or different drying temperatures in the case of at least two drying steps.

Washing agents used may be, for example, water, alcohols, such as, for example, methanol, ethanol or propanol, or mixtures of two or more thereof as known to a skilled person in the art.

The drying temperatures here are preferably in the range of from room temperature to 200° C., more preferably of from 60 to 180° C., more preferably of from 80 to 160° C. and more preferably in the range of from 100 to 150° C. The durations of drying are preferably in the range of from 2 to 48 h, more preferably of from 4 to 36 h.

Moreover, the present invention also relates to the process as described above, additionally comprising
(iii) separating the zeolitic material from the suspension obtained according to (ii);
(iv) drying the zeolitic material, separated according to (iii), at a temperature in the range of from 100 to 150° C.

According to a particularly preferred embodiment of the process according to the invention, the zeolitic material obtained according to (iii) or (iv), preferably after (iv), is calcined in at least one additional step.

Therefore, the present invention also relates to above-described process, additionally comprising (v) calcining the zeolitic material.

It is possible in principle to feed the suspension comprising the zeolitic material directly to the calcination. Preferably, the zeolitic material is separated from the suspension, as described above, according to (iii), before the calcination. Even more preferably, the zeolitic material is dried before the calcination. The calcination conditions are known to a person skilled in the art.

Accordingly, the present invention also relates to above-described process, additionally comprising
(iii) separating the zeolitic material from the suspension obtained according to (ii);
(iv) drying the zeolitic material, separated according to (iii), preferably at a temperature in the range of from 100 to 150° C.;
(v) calcining the zeolitic material, dried according to (iv), preferably at a temperature in the range of from 300 to 750° C.

The present invention also relates to the zeolitic material having framework structure CHA, obtainable or obtained by above-described process.

The present invention also relates to a zeolitic material/as such, having framework structure CHA, having a composition comprising the molar ratio ($n$ SiO$_2$):X$_2$O$_3$ wherein X is a trivalent element, and n is at least 10, preferably at least 15, and wherein the crystal size, as determined from Scanning Electron Microscopy, is greater than 1 micrometer and wherein the chabazite framework is phase-pure having an impurity of other zeolitic frameworks, such as RUT, of less than 5%.

In this context, the term "zeolitic material as such, having framework structure CHA" relates to the calcined zeolitic material which is essentially free of water and from which the structure directing agent and any other organic compounds such as organic acids have been essentially removed by calcination.

Preferably, n is in the range of from 15 to 70, more preferably in the range of from 15 to 60, more preferably in the range of from 15 to 50. By way of example, especially preferred values of n are 15, 20, 25, 30, 40, 45, 50.

Preferably, the trivalent element X is selected from the group consisting of Al, B, G, and a mixture of two or more thereof. According to an especially preferred embodiment of the present invention, the trivalent element X is Al, and even more preferably, Al is the only trivalent element building up the CHA zeolitic framework structure.

Even more preferably, the calcined zeolitic material described above is free of alkali and/or earth alkali metals, in particular free of sodium. The term "free of alkali metal" and "free of sodium", as used in this context of the present invention relates to zeolitic materials having an alkali metal content, and a sodium content, respectively, of 1000 ppm or less, preferably 500 ppm or less, more preferably 300 ppm or less.

According to one embodiment of the present invention, the edges of at least 90%, preferably at least 95% of the crystallites of the calcined zeolitic material as described above or of the calcined zeolitic material obtainable or obtained according to the process as described above have a mean length in the range of from 1 to 10 microns, more preferred in the range from 1 to 5 microns, even more preferred in the range from 1 to 2 micrometer, determined via SEM.

According to a preferred embodiment of the present invention, the chabazite framework is phase-pure having an impurity of other zeolitic frameworks, such as RUT, of preferably less than 5%, even more preferred less than 2%, even more preferred less than 1%.

According to a preferred embodiment of the present invention, the calcined zeolitic material, obtainable or obtained by the process of the present invention, or the zeolitic material as such, having CHA framework structure, has a TOC content of 0.1 wt.-% or less, based on the total weight of the zeolitic material.

According to a preferred embodiment of the present invention, the calcined zeolitic material, obtainable or obtained by the process of the present invention, or the zeolitic material as such, having CHA framework structure, has a BET surface, determined according to DIN 66131, in the range of from 300 to 700 m$^2$/g, preferably of from 400 to 700 m$^2$/g.

According to a preferred embodiment of the present invention, the calcined zeolitic material, obtainable or obtained by the process of the present invention, or the zeolitic material as such, having CHA framework structure, has a Langmuir surface, determined according to DIN 66135, in the range of from 400 to 975 m$^2$/g, preferably of from 550 to 975 m$^2$/g.

The zeolitic material according to the present invention may be provided in the form of a powder or a sprayed material obtained from above-described separation techniques, e.g. decantation, filtration, centrifugation, or spraying.

In many industrial applications, it is often desired on the part of the user to employ not the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent. Such moldings are generally known to a person skilled in the art.

Accordingly, the present invention also relates to a molding comprising the zeolitic material having framework structure CHA of the present invention.

In general, the zeolitic material described above can be used as molecular sieve, adsorbent, catalyst, catalyst support or binder thereof. Especially preferred is the use as catalyst. For example, the zeolitic material can be used as molecular sieve to dry gases or liquids, for selective molecular separation, e.g. for the separation and/or storage of hydrocarbons or amides; as ion exchanger; as chemical carrier; as adsorbent, in particular as adsorbent for the separation of hydrocarbons or amides; or as catalyst. Most preferably, the zeolitic material according to the present invention is used as catalyst.

Therefore, the present invention also relates to a catalyst, preferably a molded catalyst, containing the zeolitic material having CHA framework structure as described above. Moreover, the present invention relates to the use of the zeolitic material having CHA framework structure as described above as a catalyst.

Moreover, the present invention relates to a method of catalyzing a chemical reaction wherein the zeolitic material having CHA framework structure according to the present invention is employed as catalytically active material.

Among others, said catalyst may be employed as catalyst for the selective reduction (SCR) of nitrogen oxides $NO_x$; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; as catalyst in the production of light olefins from a feedstock comprising an oxygenate or mixtures of oxygenates, such as the methanol to olefin reaction; as catalyst in "stationary source" processes; or as catalyst in methanol to olefins.

Most preferably, the zeolitic material according to the present invention or the zeolitic material obtainable of obtained according to the present invention is used as catalyst, preferably as molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for SCR (selective catalytic reduction) of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Therefore, the present invention also relates to a method for selectively reducing nitrogen oxides $NO_x$, wherein a gaseous stream containing nitrogen oxides $NO_x$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methylglyoxal, glyoxylic acid or in processes for burning nitrogeneous materials may be mentioned.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The following examples shall further illustrate the process and the materials of the present invention.

EXAMPLES

Example 1: Production of an Alkali Metal (Na) Free Chabazite and its Use in Catalysis 1.1 Preparation of the Synthesis Gel
The following starting materials were employed:
Trimethyl-1-adamantylammonium hydroxide (TMAA, 13.26 wt.-% in water)
Tetramethylammonium hydroxide (TMAOH, 25 wt.-% in water (Aldrich, Lot 1368537))
Aluminum triisopropylate (Aldrich 217557)
Ludox AS40 (Grace Davison)
In a 5 liter beaker, 729.7 g of TMAA and 231.1 g of TMAOH solution were mixed. This solution was stirred for 10 min at room temperature. Then, 86.6 g of Aluminum triisopropylate were added, and the resulting suspension was stirred for about 60 min. Subsequently, 952.6 g of Ludox AS40 were added, and the resulting suspension was stirred for about 20 min.

The pH of the obtained suspension was measured as 14.2 where the OH/Si was 0.172.

The suspension had a composition with the following molar ratios: 36 $SiO_2$:2.4 Al is-prop.:2.6 TMAA:3.6 TMAOH:434 $H_2O$. This gel was transferred in to a 2.5 liter autoclave.

1.2 Hydrothermal Crystallization

The autoclave was sealed and heated to a temperature of 170° C. The temperature of 170° C. was maintained for 48 h. Thereby, the mixture in a 2.5 L autoclave was stirred at 200 rpm (revolutions/minute).

1.3 Separation, Drying, and Calcination

After the hydrothermal crystallization, the resulting suspension had a pH of 12.6. This suspension was admixed (1:1) with deionized water, and the pH of the resulting suspension was adjusted to 6 with 5% $HNO_3$. Then, the suspension was filtrated with a porcelain suction filter with a diameter if 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was 403 g. A sample of the calcined material was examined via XRD, and it was found that a zeolite having CHA framework had been obtained (see FIG. 1).

1.4 Characterization of the Product

Elementary analysis of calcined material obtained according to 1.3 showed less than 0.1 wt % of C, and less than 0.5 wt % of N. The Na content was 0.09 wt % $Na_2O$ reported on a volatile free basis. The $SiO_2$:$Al_2O_3$ was 30:1

The BET surface of the calcined material was 505 $m^2$/g, determined according to DIN 66131, and the Langmuir surface area was 677 $m^2$/g, determined according to DIN 66135. Typical crystallites had a mean length of about 1-2 micrometers (see FIGS. New 2-4).

Example 2: Preparation of Cu Chabazite Catalyst for SCR

A Cu containing catalyst was prepared by ion-exchange with copper acetate. A 0.3 M copper (II) acetate monohydrate solution was prepared by dissolving 96 g of the copper salt in 1.6 L of deionized water at 60° C. 300 g of the calcined zeolite of example 1 was then added to this solution. An ion-exchange reaction between the H-form of the calcined zeolite described in example 1 and the copper ions was carried out by agitating the slurry at 60° C. for 1 hour. The pH was between 4.5 and 4.8 during the reaction. The resulting mixture was then filtered, washed until the filtrate had a conductivity of <200 $\mu$Scm$^{-1}$, which indicated that substantially no soluble or free copper remained in the sample, and the washed sample was dried at 90° C. The obtained Cu catalyst comprised CuO at 3.29% by weight and Na at 300 ppm, both reported on a volatile free basis. The BET surface of the calcined material was 468 $m^2$/g, determined according to DIN 66131, and the Langmuir surface area was 636 $m^2$/g, determined according to DIN 66135.

Example 3: SCR Test of Sample from Example 2

3.1 Preparation of a slurry 150 g of the spray-dried and calcined zeolitic material containing Cu and having CHA framework structure, obtained according to example 6 was mixed with 358 ml of deionized water. The mixture was ball-milled for 11 hours to obtain a slurry which comprised 90% particles smaller than 10 micrometer. 26 g of zirconium acetate in dilute acetic acid (containing 30% $ZrO_2$) were added to the slurry with agitation.

3.2 Coating

The slurry was coated onto 1" D×3" L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated to obtain a target washcoat loading of 0.146 $g/cm^3$ (2.4 $g/in^3$). The washcoat loading is defined as the dry weight gain on the honeycomb with respect to volume.

3.3 Measuring NOx Selective Catalytic Reduction (SCR) Efficiency

Nitrogen oxides selective catalytic reduction (SCR) efficiency and selectivity of a fresh catalyst core were measured by adding a feed gas mixture of 500 ppm of NO, 500 ppm of $NH_3$, 10% $O_2$, 5% $H_2O$, balanced with $N_2$ to a steady state reactor containing a 1" D×3" L catalyst core.

For the catalytic test, the washcoated core was shaped into a square cross section wrapped with a ceramic insulation mat and placed inside an Inconel reactor tube heated by an electrical furnace. The gases, $O_2$ (from air), $N_2$ and $H_2O$ were preheated in a preheater furnace before entering the reactor. The reactive gases NO and $NH_3$ were introduced between the preheater furnace and the reactor.

The reaction was carried at a space velocity of 80,000 $h^{-1}$ across a 150° C. to 460° C. temperature range. Space velocity is defined as the gas flow rate comprising the entire reaction mixture divided by the geometric volume of the catalyst core. These conditions define the standard test for fresh catalysts.

FIG. 5 shows the results of the SCR test, indicating the catalytic efficiency and selectivity of the fresh catalyst. There is a desire to provide materials that exhibit high performance over a wide temperature range, particularly with improvement of low temperature performance. Performance includes NOx conversion but, also selectivity of the SCR to N2 reflected by minimizing the formation of N2O. It can be seen that this catalysts exhibits high NOx conversion across the entire temperature window together with low N2O make (<10 ppm N2O). These performance characteristics are comparable to those of the traditional multistep product described in comparative example 3.

3.4 Measuring Hydrothermal Stability of the Catalyst

Hydrothermal stability of the catalyst was measured by hydrothermal aging of the fresh catalyst core (described above under section 3.2) in the presence of 10 wt.-% $H_2O$ at 850° C. for 6 hours, followed by measurement of the nitrogen oxides SCR efficiency and selectivity by the same process, as outlined above under section 3.3, for the SCR evaluation on a fresh catalyst core.

The results of the SCR efficiency and selectivity of the aged catalyst is depicted in FIG. 6. There is a desire to improve hydrothermal durability over existing zeolitic materials, for example, catalyst materials which are stable at temperatures up to at least about 650° C. and higher, for example in the range of about 700° C. to about 900° C. It can be seen that this catalyst maintains high NOx conversion over the entire temperature window whilst maintaining high selectivity towards nitrogen which is reflected in the low N2O make (<20 ppm N2O). The results are comparable to the multi-step product described in comparative example 3.

Example 4: Production of an Alkali Metal (Na) Free Chabazite Using Aerosil as the Silica Source 4.1 Preparation of the Synthesis Gel The following starting materials were employed:
Trimethyl-1-adamantylammonium hydroxide (TMAA, 13.26 wt.-% in water)
Tetramethylammonium hydroxide (TMAOH, 25 wt.-% in water, Aldrich)
Aluminum triisopropylate (Aldrich 217557)
Aerosil 200 (Degussa)

In a 5 liter beaker, 426.8 g of TMAA, 135.1 g of TMAOH solution and 1164.7 g deionized water were mixed. This solution was stirred for 10 min at room temperature. Then, 50.6 g of Aluminum triisopropylate were added, and the resulting suspension was stirred for about 60 min. Subsequently, 222.7 g of Aerosil Silica were added, and the resulting suspension was stirred for about 20 min.

The pH of the obtained suspension was measured as 12.5 where the OH/Si was 0.172.

The suspension had a composition with the following molar ratios: 36 $SiO_2$:2.4 Al is-prop.:2.6 TMAA:3.6 TMAOH:881 $H_2O$. This gel was transferred in to a 2.5 liter autoclave.

4.2 Hydrothermal Crystallization

The autoclave was sealed and heated to a temperature of 170° C. The temperature of 170° C. was maintained for 48 h. Thereby, the mixture in a 2.5 L autoclave was stirred at 200 rpm (revolutions/minute).

4.3 Separation, Drying, and Calcination

After the hydrothermal crystallization, the resulting suspension had a pH of 10.5. This suspension was admixed (1:1) with deionized water, and the pH of the resulting suspension was adjusted to 6 with 5% $HNO_3$. Then, the suspension was filtrated with a porcelain suction filter with a diameter if 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was 224 g. A sample of the calcined material was examined via XRD, and it was found that a zeolite having CHA framework had been obtained (see FIG. 7).

4.4 Characterization of the Product

Elementary analysis of calcined material obtained according to 1.3 showed less than 0.1 wt % of C, and less than 0.5 wt % of N. The Na content was 0.03 wt % $Na_2O$ reported on a volatile free basis. The $SiO_2$:$Al_2O_3$ was 28:1

The BET surface of the calcined material was 493 $m^2$/g, determined according to DIN 66131, and the Langmuir surface area was 660 $m^2$/g, determined according to DIN 66135. Typical crystallites had a mean length of about 2 to 4 micrometers (see FIGS. 8-10).

Comparative Example 1: Production of Na Chabazite and its Use in Catalysis 1.1 Preparation of the Synthesis Gel The following starting materials were employed:
Trimethyl-1-adamantylammonium hydroxide (TMAA, 13.26 wt.-% in water)
sodium hydroxide (>98% NaOH (anhydrous pellets), Aldrich)
Aluminum triisopropylate (Aldrich 217557)
Ludox AS40 (Grace Davison)

In a 5 liter beaker, 894.7 g of TMAA and 31.2 g of NaOH solution were mixed. This solution was stirred for 10 min at room temperature. Then, 106.2 g of Aluminum triisopropylate were added, and the resulting suspension was stirred for about 60 min. Subsequently, 1168 g of Ludox AS40 were added, and the resulting suspension was stirred for about 20 min.

The pH of the obtained suspension was measured as 13.7 where the OH/Si was 0.172.

The suspension had a composition with the following molar ratios: 36 $SiO_2$:2.4 Al is-prop.:2.6 TMAA:3.6 NaOH: 379 $H_2O$. This gel was transferred in to a 2.5 liter autoclave.

1.2 Hydrothermal Crystallization

The autoclave was sealed and heated to a temperature of 170° C. The temperature of 170° C. was maintained for 40 h. Thereby, the mixture in a 2.5 L autoclave was stirred at 200 rpm (revolutions/minute).

1.3 Separation, Drying, and Calcination

After the hydrothermal crystallization, the resulting suspension had a pH of 11.9. This suspension was admixed (1:1) with deionized water, and the pH of the resulting suspension was adjusted to 7 with 5% $HNO_3$. Then, the suspension was filtrated with a porcelain suction filter with a diameter if 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was 420 g. A sample of the calcined material was examined via XRD, and it was found that a zeolite having CHA framework had been obtained (see FIG. 11).

1.4 Characterization of the Product

Elementary analysis of calcined material obtained according to 1.3 showed less than 0.1 wt % of C, and less than 0.5 wt % of N. The Na content was 0.7 wt % $Na_2O$ reported on a volatile free basis. The $SiO_2$:$Al_2O_3$ was 30:1

The BET surface of the calcined material was 592 $m^2$/g, determined according to DIN 66131, and the Langmuir surface area was 803 $m^2$/g, determined according to DIN 66135. Typical crystallites had a mean length of about 73 nanometers as determined by xrd but, also shown in the SEM images (see FIGS. 12-14).

Comparative Example 2: Preparation of NH4 Form then Cu Chabazite Catalyst for SCR 2.1 Ammonium Exchange An ammonium exchange was carried out to reduce the Na content of the material. The $NH_4$-form of the zeolite was prepared by ion-exchange with ammonium nitrate. 40 g of ammonium nitrate was dissolved in 4000 g of deionized water with mixing. This solution was heated to 60° C. Then 400 g of calcined Na-zeolite as described in comparative example 1.4 was added to the solution. An ammonium exchange was carried out at 60° C. for 1 hour. The resulting mixture was then filtered, washed until the filtrate had a conductivity of <200 $\mu Scm^{-1}$, which indicated that substantially no soluble or free ions remained in the sample, and the washed sample was dried at 90° C. The obtained $NH_4$-form zeolite comprised $NH_4$ at 0.62% by weight and $Na_2O$ at less than 100 ppm.

2.3 Copper Exchange

A Cu containing catalyst was prepared by ion-exchange with copper acetate. A copper (II) acetate monohydrate solution was prepared by dissolving 47.9 g of the copper salt in 800 L of deionized water at 60° C. 200 g of the NH4-form described in comparative example 2.1 was then added to this solution. An ion-exchange reaction between the $NH_4$-form of the zeolite described in comparative example 2.1 and the copper ions was carried out by agitating the slurry at 60° C. for 1 hour. The pH was between 5 and 5.3 during the reaction. The resulting mixture was then filtered, washed until the filtrate had a conductivity of <200 μScm$^{-1}$, which indicated that substantially no soluble or free copper remained in the sample, and the washed sample was dried at 90° C. The obtained Cu catalyst comprised CuO at 3.4% by weight and Na$_2$O at less than 100 ppm. The SiO$_2$:Al$_2$O$_3$ was 29.

Comparative Example 3: SCR Test of Sample from Comparative Example 2

3.1 Preparation of a Slurry 150 g of the spray-dried and calcined zeolitic material containing Cu and having CHA framework structure, obtained according to comparative example 2.3 was mixed with 358 ml of deionized water. The mixture was ball-milled for 11 hours to obtain a slurry which comprised 90% particles smaller than 10 micrometer. 26 g of zirconium acetate in dilute acetic acid (containing 30% ZrO$_2$) were added to the slurry with agitation.

3.2 Coating

The slurry was coated onto 1" D×3" L cellular ceramic cores having a cell density of 65 cpsc (cells per square cm) (400 cpsi (cells per square inch)) and a wall thickness of 6.5 mm. The coated cores were dried at 110° C. for 3 hours and calcined at 400° C. for 1 hour. The coating process was repeated to obtain a target washcoat loading of 0.146 g/cm$^3$ (2.4 g/in$^3$). The washcoat loading is defined as the dry weight gain on the honeycomb with respect to volume.

3.3 Measuring NOx Selective Catalytic Reduction (SCR) Efficiency

Nitrogen oxides selective catalytic reduction (SCR) efficiency and selectivity of a fresh catalyst core were measured by adding a feed gas mixture of 500 ppm of NO, 500 ppm of NH$_3$, 10% O$_2$, 5% H$_2$O, balanced with N$_2$ to a steady state reactor containing a 1" D×3" L catalyst core.

For the catalytic test, the washcoated core was shaped into a square cross section wrapped with a ceramic insulation mat and placed inside an Inconel reactor tube heated by an electrical furnace. The gases, O$_2$ (from air), N$_2$ and H$_2$O were preheated in a preheater furnace before entering the reactor. The reactive gases NO and NH$_3$ were introduced between the preheater furnace and the reactor.

The reaction was carried at a space velocity of 80,000 h$^{-1}$ across a 200° C. to 460° C. temperature range. Space velocity is defined as the gas flow rate comprising the entire reaction mixture divided by the geometric volume of the catalyst core. These conditions define the standard test for fresh catalysts.

FIG. 15 shows the results of the SCR test, indicating the catalytic efficiency and selectivity of the fresh catalyst. There is a desire to provide materials that exhibit high performance over a wide temperature range, particularly with improvement of low temperature performance. Performance includes NOx conversion but, also selectivity of the SCR to N2 reflected by minimizing the formation of N2O. It can be seen that this catalysts exhibits high NOx conversion across the entire temperature window together with low N2O make (<10 ppm N2O).

3.4 Measuring Hydrothermal Stability of the Catalyst

Hydrothermal stability of the catalyst was measured by hydrothermal aging of the fresh catalyst core (described above under section 3.2 of the comparative examples) in the presence of 10 wt.-% H$_2$O at 850° C. for 6 hours, followed by measurement of the nitrogen oxides SCR efficiency and selectivity by the same process, as outlined above under section 3.3 of the comparative examples, for the SCR evaluation on a fresh catalyst core.

The results of the SCR efficiency and selectivity of the aged catalyst is depicted in FIG. 16. There is a desire to improve hydrothermal durability over existing zeolitic materials, for example, catalyst materials which are stable at temperatures up to at least about 650° C. and higher, for example in the range of about 700° C. to about 900° C. It can be seen that this catalyst maintains high NOx conversion over the entire temperature window whilst maintaining high selectivity towards nitrogen which is reflected in the low N$_2$O make (<20 ppm N$_2$O).

Comparative Example 4: Production of an Alkali Metal Free Chabazite Using Increased Amounts of Trimethyladamantyl Ammonium Hydroxide 4.1 Preparation of the Synthesis Gel The following starting materials were employed:
Trimethyl-1-adamantylammonium hydroxide (TMAA, 20.17 wt.-% in water)
Aluminum triisopropylate (Aldrich 217557)
Ludox AS40 (Grace Davison)

In a 5 liter beaker, 1048.2 g of TMAA were mixed. This solution was stirred for 10 min at room temperature. Then, 79.3 g of Aluminum triisopropylate were added, and the resulting suspension was stirred for about 60 min. Subsequently, 872.5 g of Ludox AS40 were added, and the resulting suspension was stirred for about 20 min.

The pH of the obtained suspension was measured as 13.5 where the OH/Si was 0.172.

The suspension had a composition with the following molar ratios: 36 SiO$_2$:2.4 Al is-prop.:6.2 TMAA:468 H$_2$O. This gel was transferred in to a 2.5 liter autoclave.

4.2 Hydrothermal Crystallization

The autoclave was sealed and heated to a temperature of 170° C. The temperature of 170° C. was maintained for 48 h. Thereby, the mixture in a 2.5 L autoclave was stirred at 200 rpm (revolutions/minute).

4.3 Separation, Drying, and Calcination

After the hydrothermal crystallization, the resulting suspension had a pH of 12.4. This suspension was admixed (1:1) with deionized water, and the pH of the resulting suspension was adjusted to 6 with 5% HNO$_3$. Then, the suspension was filtrated with a porcelain suction filter with a diameter if 15 cm. The wet product was heated to a temperature of 120° C. in air within 30 min and dried at 120° C. for 240 min. The dried product was then heated to a temperature of 600° C. within 240 min and calcined in air at 600° C. for 300 min. The yield was ~368 g. A sample of the calcined material was examined via XRD, and it was found that a zeolite having CHA framework had been obtained (see FIG. 17).

4.4 Characterization of the Product

Elementary analysis of calcined material obtained according to 1.3 showed less than 0.1 wt % of C, and less than 0.5 wt % of N. The Na content was 0.17 wt % Na$_2$O reported on a volatile free basis. The higher Na content is attributed to Na from the TMAA solution. The SiO$_2$:Al$_2$O$_3$ was 30:1

The BET surface of the calcined material was 711 m$^2$/g, determined according to DIN 66131, and the Langmuir surface area was 960 m$^2$/g, determined according to DIN 66135. SEM images of the product indicate that the product has agglomerates of ~1 micron. Where the primary particle size has typical crystallites with a mean length of less than about 80 nanometers (see FIG. 18). This was confirmed by measurement by xrd.

The invention is advantageous as it avoids ion-exchange steps normally needed to attain a catalytic composition of low-alkali metal content. Additionally the process provides a time and cost saving process for the preparation of zeolitic materials having CHA framework structure and avoids the additional complexity of ion-exchange steps. The ion-exchange steps can lead to instability in the zeolitic materials through processes such as dealumination. The larger crystals formed by the inventive process could offer improved stability.

SHORT DESCRIPTION OF THE FIGURES

FIG. 1 shows the XRD pattern of the calcined zeolitic material having CHA framework type according to Example 1. The powder X-ray diffraction patterns were recorded on a Siemens D-5000 with monochromatic Cu K alpha-1 radiation, a capillary sample holder being used in order to avoid preferred orientation. The diffraction data were collected using a position-sensitive detector from Braun, in the range from 8 to 96° (2 theta) and with a step width of 0.0678°. Indexing of the powder pattern was effected using Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities (LC=Line counts) are plotted along the ordinate.

Figure 5:
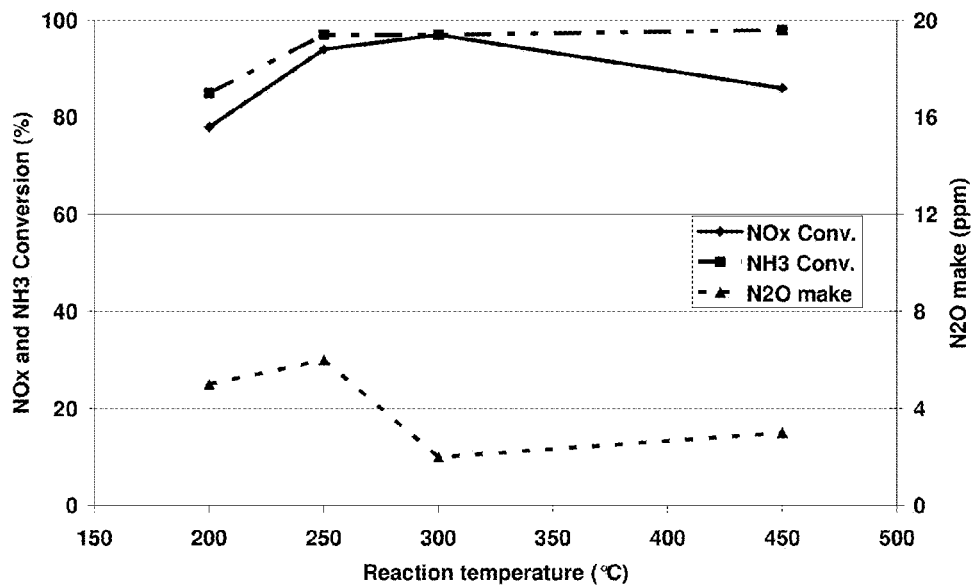

FIG. 5 shows the result of an SCR test of the material obtained according to example 2 applied onto a cellular ceramic core according to example 3 (fresh SCR). Abbreviation "%" for the conversion of NOx, and $NH_3$. Abbreviation "ppm" for N20 make. The symbols of the curves represent the following chemical compounds:
- ♦ NOx (conversion)
- ■ $NH_3$ (conversion)
- ▲ $N_2O$ (production)

Figure 6:
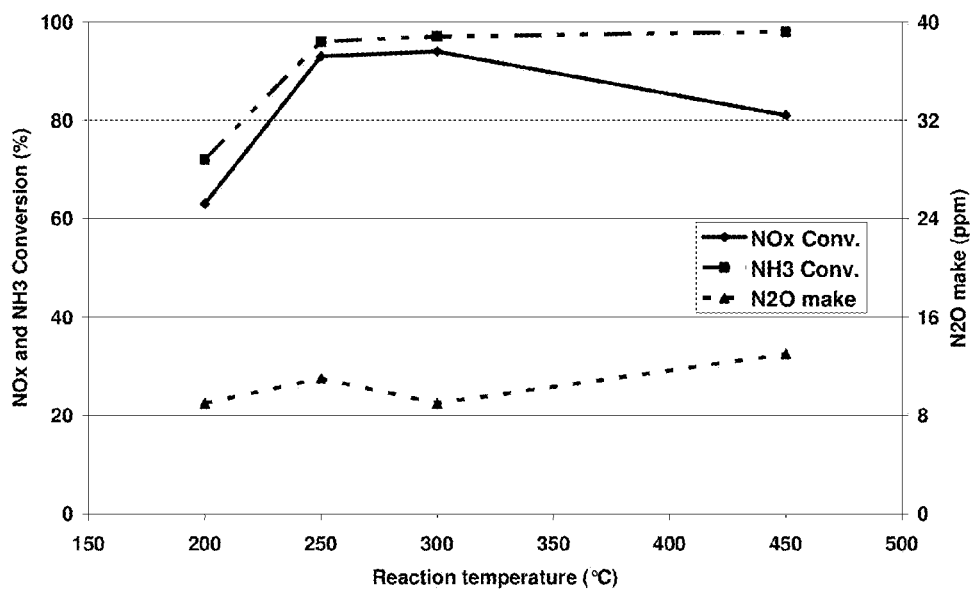

FIG. 6 shows the result of an SCR test of the material obtained according to example 2 applied onto a cellular ceramic core according to example 2 (aged SCR). Abbreviation "%" for the conversion of NOx, and $NH_3$. Abbreviation "ppm" for N20 make. The symbols of the curves represent the following chemical compounds
- ♦ NOx (conversion)
- ■ $NH_3$ (conversion)
- ▲ $N_2O$ (production)

Figure 1:
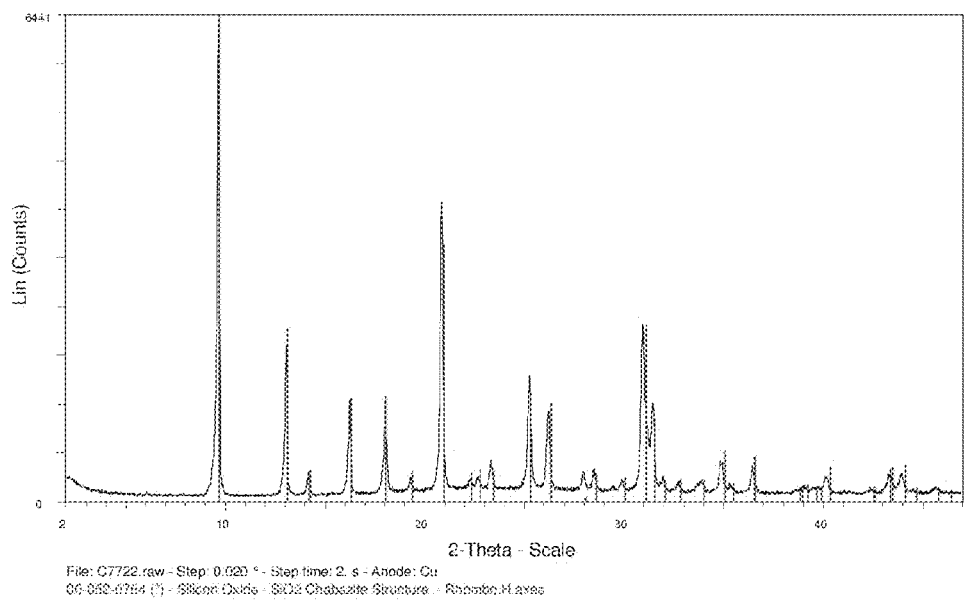
Figure 2:
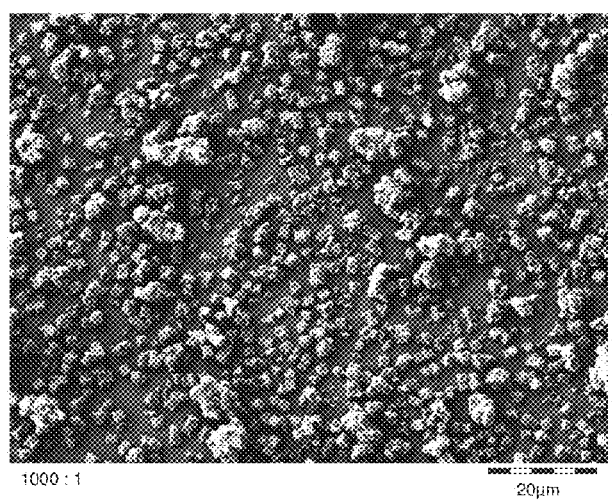
FIG. 2 shows crystallites of the calcined zeolitic material having CHA framework type according to Example 1, determined by SEM (Fig. with secondary electrons 5 kV; scale: 1000:1).
Figure 3:
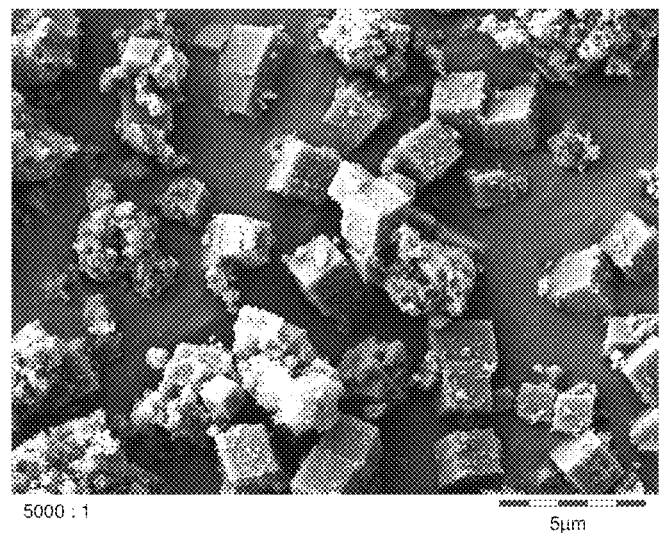
FIG. 3 shows crystallites of the calcined zeolitic material having CHA framework type according to Example 1, determined by SEM (Fig. with secondary electrons 5 kV; scale: 5000:1).
Figure 4:
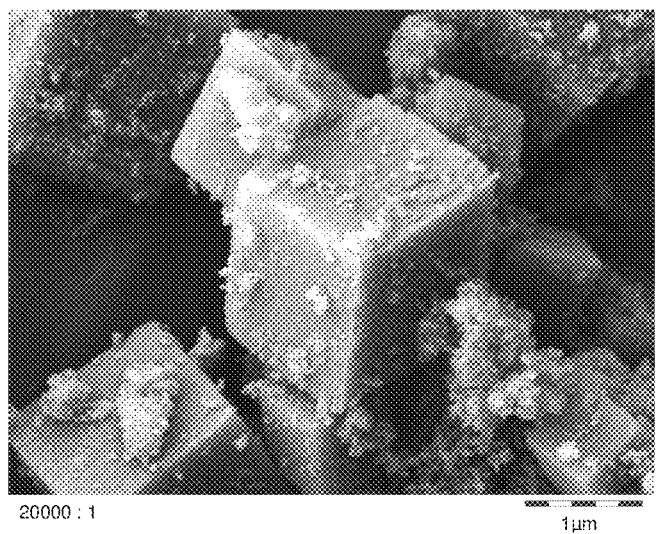
FIG. 4 shows crystallites of the calcined zeolitic material having CHA framework type according to Example 1, determined by SEM (Fig. with secondary electrons 5 kV; scale: 20000:1).
Figure 7:
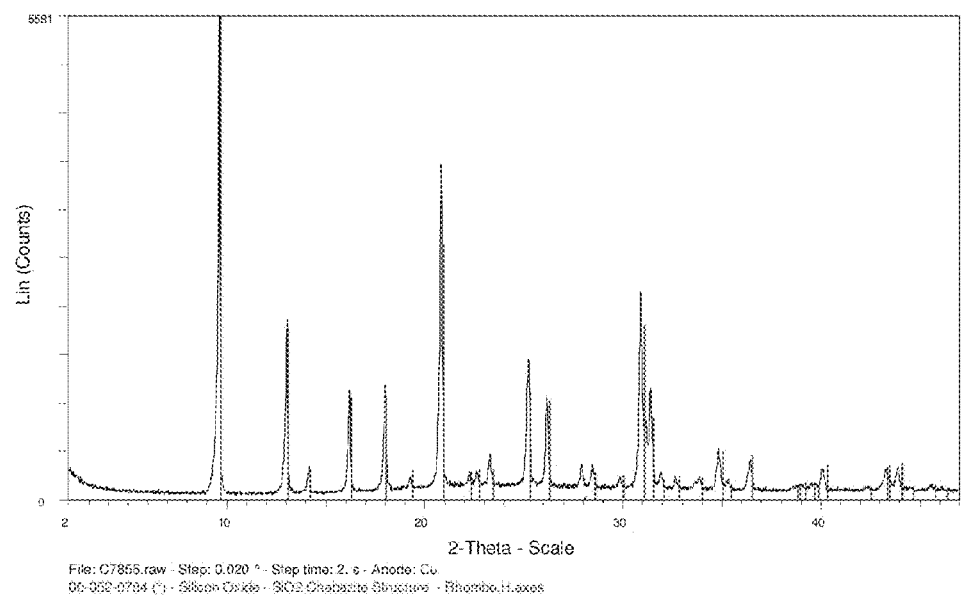

FIG. 7 shows the XRD pattern of the calcined zeolitic material having CHA framework type according to example 4. As to the method of determining the XRD pattern, see FIG. 1.

Figure 8:
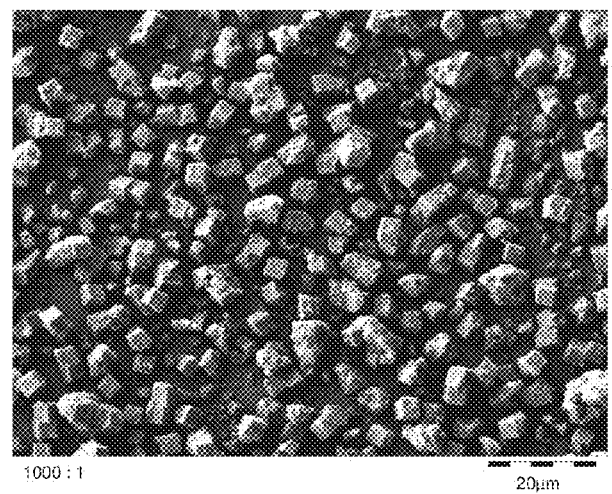

FIG. 8 shows crystallites of the calcined zeolitic material having CHA framework type according to example 4, determined by SEM (Fig. with secondary electrons 5 kV; scale: 5000:1).

Figure 9:
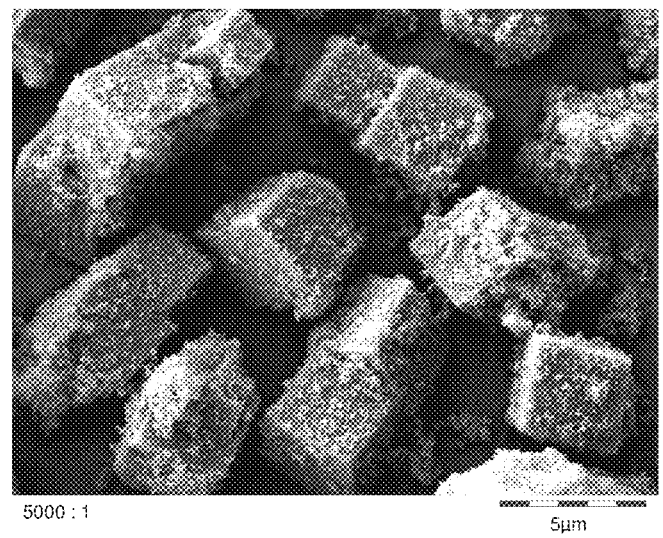

FIG. 9 shows crystallites of the calcined zeolitic material having CHA framework type according to comparative example 4, determined by SEM (Fig. with secondary electrons 5 kV; scale: 20000:1).

Figure 10:
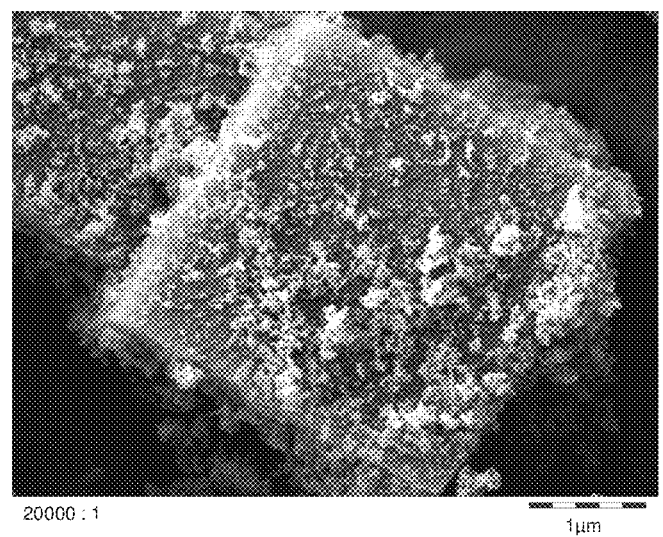

FIG. 10 shows crystallites of the calcined zeolitic material having CHA framework type according to comparative example 4, determined by SEM (Fig. with secondary electrons 5 kV; scale: 50000:1).

Figure 11:
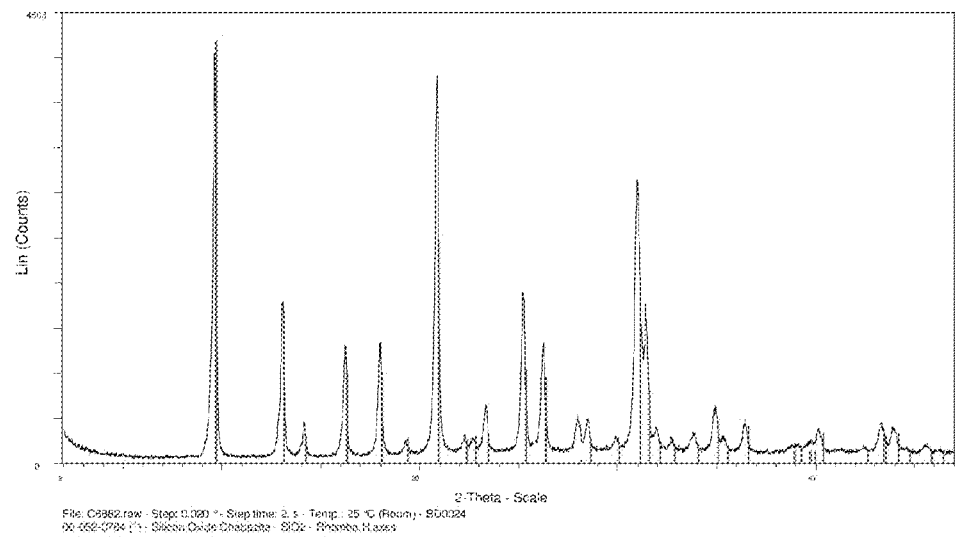

FIG. 11 shows the XRD pattern of the Cu containing calcined zeolitic material having CHA framework type according to comparative example 1. As to the method of determining the XRD pattern, see FIG. 1.

Figure 12:
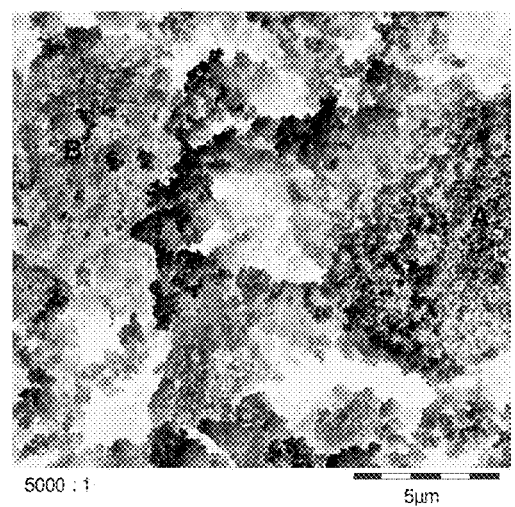

FIG. 12 shows crystallites of the calcined zeolitic material having CHA framework type according to comparative example 1, determined by SEM (Fig. with secondary electrons 5 kV; scale: 5000:1).

Figure 13:
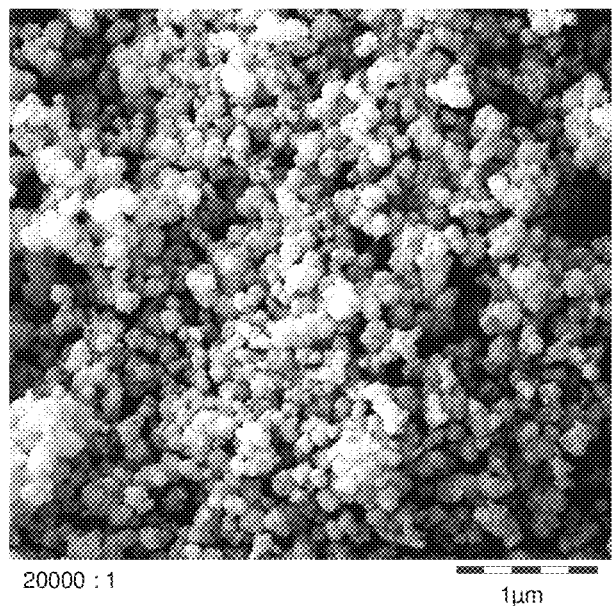

FIG. 13 shows crystallites of the calcined zeolitic material having CHA framework type according to comparative example 1, determined by SEM (Fig. with secondary electrons 5 kV; scale: 20000:1).

Figure 14:
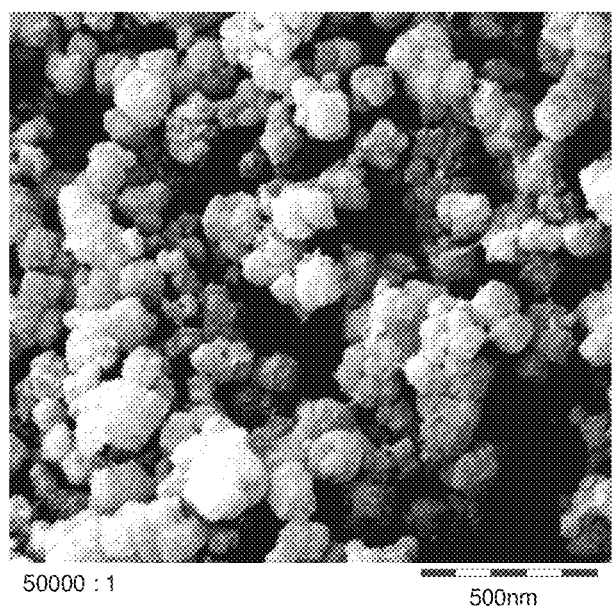

FIG. 14 shows crystallites of the calcined zeolitic material having CHA framework type according to comparative example 1, determined by SEM (Fig. with secondary electrons 5 kV; scale: 50000:1)

Figure 15:
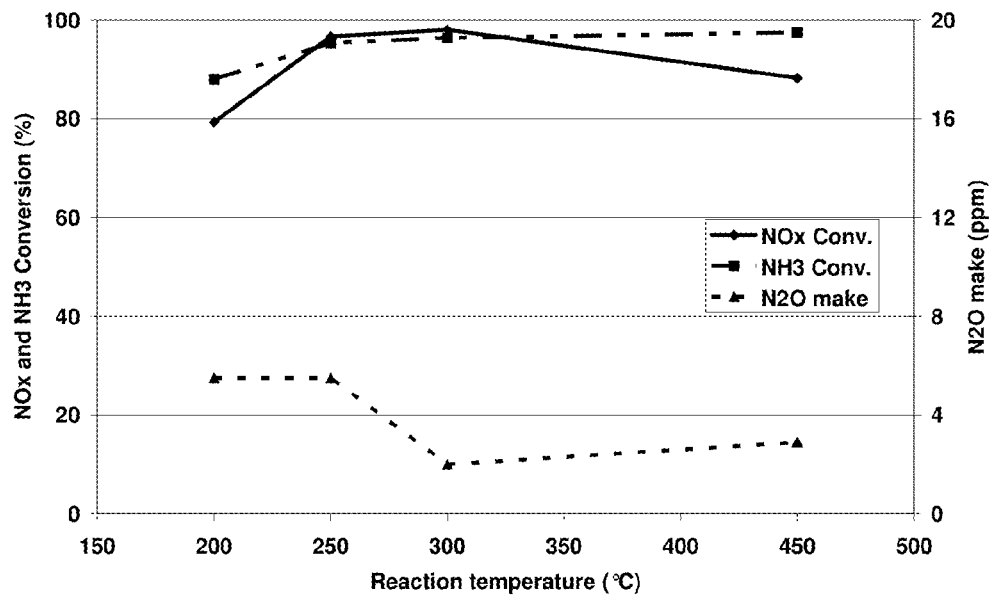

FIG. 15 shows the result of an SCR test of the material obtained according to comparative example 2 applied onto a cellular ceramic core according to comparative example 3 (fresh SCR). Abbreviation "%" for the conversion of NOx, and $NH_3$. Abbreviation "ppm" for N20 make. The symbols of the curves represent the following chemical compounds:
- ♦ NOx (conversion)
- ■ $NH_3$ (conversion)
- ▲ $N_2O$ (production)

Figure 16:
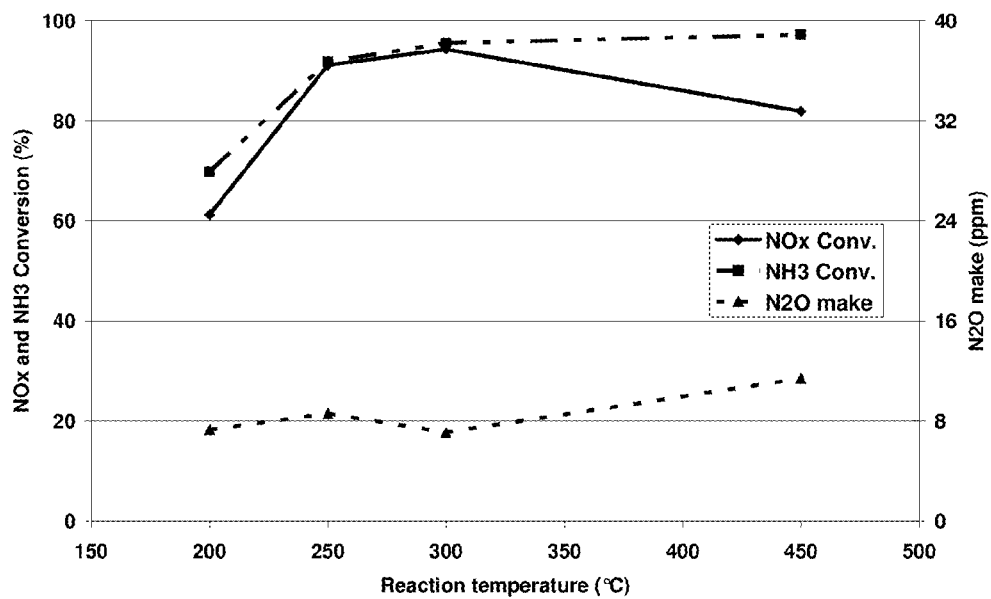

FIG. 16 shows the result of an SCR test of the material obtained according to comparative example 2 applied onto a cellular ceramic core according to comparative example 3 (aged SCR). Abbreviation "%" for the conversion of NOx, and $NH_3$. Abbreviation "ppm" for N20 make. The symbols of the curves represent the following chemical compounds
- ♦ NOx (conversion)
- ■ $NH_3$ (conversion)
- ▲ $N_2O$ (production)

Figure 17:
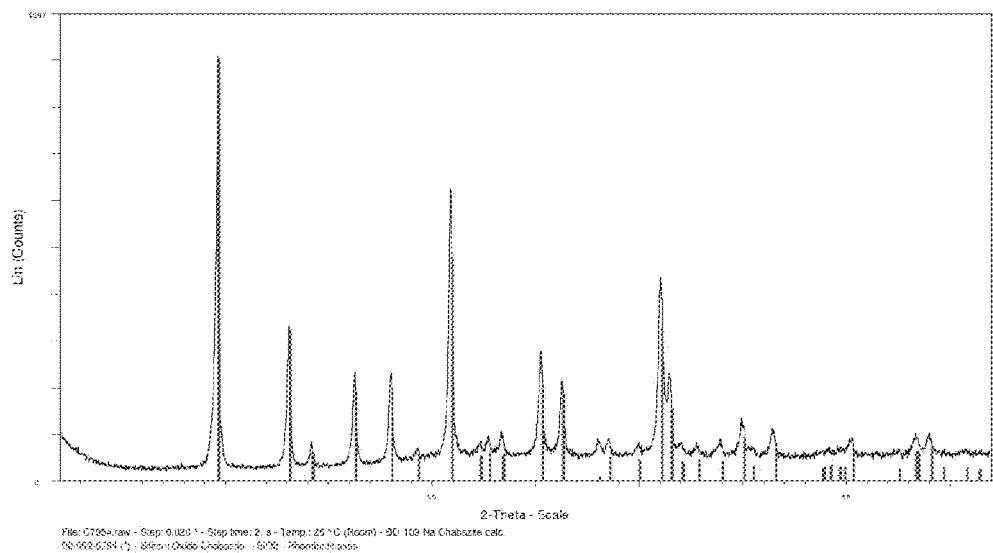

FIG. 17 shows the XRD pattern of the calcined zeolitic material having CHA framework type according to comparative example 4. As to the method of determining the XRD pattern, see FIG. 1.

Figure 18:
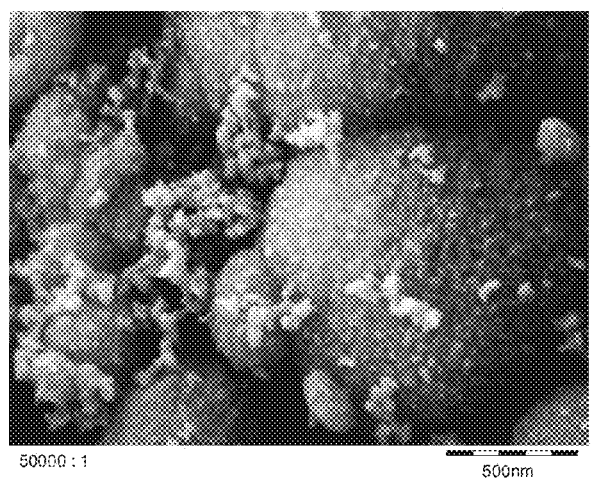

FIG. 18 shows crystallites of the calcined zeolitic material having CHA framework type according to comparative example 4, determined by SEM (Fig. with secondary electrons 5 kV; scale: 50000:1).

The invention claimed is:

1. A zeolitic material having framework structure CHA, having a composition comprising the molar ratio (n $SiO_2$): $X_2O_3$, wherein X is a trivalent element, and wherein X is selected from Al, B, Ga, and a mixture of two or more, and n is at least 10, obtainable by a process comprising:
   (i) preparation of an aqueous solution containing:
      at least one source for $X_2O_3$, wherein X is selected from Al, B, Ga, and a mixture of two or more,
      at least one source for $SiO_2$,
      at least one organic structure directing agent (SDA) other than Tetramethylammonium hydroxide (TMAOH) as a template for the CHA structure, and
      Tetramethylammonium hydroxide (TMAOH), wherein the SDA or mixtures thereof are employed in such amounts that the aqueous solution in (i) exhibits a molar ratio of SDA:TMAOH in the range of 0.01 to 5;

(ii) hydrothermal crystallization of the aqueous solution according to (i);

wherein the aqueous solution of (i) contains copper in an amount less than 0.005 Cu: ((n $SiO_2$)+$X_2O_3$) where n is at least 10, and wherein the zeolitic material having framework structure CHA has a sodium content of 1000 ppm or less.

2. A method for the selective reduction (SCR) of nitrogen oxides $NO_x$, for the oxidation of $NH_3$ or for the decomposition of $N_2O$, the method comprising contacting a stream comprising NOx, $NH_3$ or $N_2O$ with a catalyst comprising the zeolitic material of claim 1.

3. A method for catalyzing a chemical reaction, the method comprising using the zeolitic material of claim 1 as a catalytically active material in a chemical reaction.

4. A catalyst comprising the zeolitic material of claim claim 1.

5. The zeolitic material of claim 1, wherein the aqueous solution obtained in (i) and subjected to hydrothermal crystallization in (ii) is free of sodium.

6. The zeolitic material of claim 1, wherein the aqueous solution obtained in (i) and subjected to hydrothermal crystallization in (ii) has a sodium content of 1000 ppm or less.

7. The zeolitic material of claim 1, wherein the zeolitic material is free of sodium.

8. A zeolitic material having framework structure CHA, having a composition comprising the molar ratio (n $SiO_2$): $X_2O_3$, wherein X is a trivalent element, and wherein X is selected from Al, B, Ga, and a mixture of two or more, and n is at least 10, and wherein the crystal size of that zeolitic material, as determined from Scanning Electron Microscopy, is greater than 1 micrometer and wherein the chabazite framework is phase-pure having an impurity of other zeolitic frameworks of less than 5%, as determined by X-ray Diffraction, and wherein the zeolitic material having framework structure CHA has a sodium content of 1000 ppm or less.

9. The zeolitic material of claim 8, wherein the crystal size is in the range of greater than 1 micron to 5 microns.

10. The zeolitic material of claim 8, wherein the chabazite framework is phase-pure having an impurity of other zeolitic frameworks of less than 1%.

11. A method for the selective reduction (SCR) of nitrogen oxides $NO_x$, for the oxidation of $NH_3$ or for the decomposition of $N_2O$, the method comprising contacting a stream comprising NOx, $NH_3$ or $N_2O$ with a catalyst comprising the zeolitic material of claim 8.

12. A method for catalyzing a chemical reaction, the method comprising using the zeolitic material of claim 8 as a catalytically active material in a chemical reaction.

13. A catalyst comprising the zeolitic material of claim 8.

14. The zeolitic material of claim 8, wherein the zeolitic material is free of sodium.

\* \* \* \* \*